United States Patent Office

2,769,762
Patented Nov. 6, 1956

2,769,762

PRODUCTION OF NAPHTHAS OF IMPROVED CHARACTERISTICS BY TREATING WITH BAUXITE

Weldon Grant Annable, Mundelein, Le Roi E. Hutchings, Crystal Lake, and Kenneth Lucas, Woodstock, Ill., assignors to The Pure Oil Company, Chicago, Ill., a corporation of Ohio No Drawing. Application August 31, 1953,
Serial No. 377,672

4 Claims. (Cl. 196—28)

The present invention relates to a process for catalytically desulfurizing hydrocarbon mixtures containing sulfur compounds to produce improved naphthas having low corrosive sulfur contents. The naphtha products produced by the present invention are further characterized by their ability to pass the distillation-corrosion test.

It is known in the prior art to treat various types of sulfur-containing hydrocarbons with catalytic or non-catalytic contact materials including metal oxides and sulfides, fuller's earth, clays, and bauxite under conditions to remove or convert sulfur compounds to forms which are readily removable from the hydrocarbons. During such processes, when conducted under catalytic conditions particularly, it is taught that the appearance of hydrogen sulfide in the effluent treated vapors therefrom is an indication that the contact material has been substantially converted to the sulfide and the treatment should be terminated when or before a substantial amount of hydrogen sulfide appears in the treated products. In some processes it is said to be advantageous to remove the hydrogen sulfide and other by-products of the desulfurization reactions before they have had a chance to recombine with the hydrocarbons and form corrosive products. In some instances, the desulfurization reaction is terminated at a point before 60 to 100 percent completion of the desulfurization reaction.

According to the present invention, it has been found that in order to produce naphtha products which are non-corrosive to the distillation-corrosion test, the reaction, be it chemical or physical, between the contact material and the sulfur compounds must be terminated before hydrogen sulfide becomes a product of the reaction. The principal desulfurization reaction which is characterized by production of hydrogen sulfide has been found to be preceded by an initial reaction in which hydrogen sulfide and other corrosive sulfur compounds are not by-products and the resultant treated hydrocarbons have become non-corrosive and free of those types of sulfur compounds which give a positive distillation-corrosion test. Although in practicing the invention there is experienced a slight reduction in the over-all yield, this is offset by the production of highly desirable naphthas having the ability to pass the distillation-corrosion test.

Accordingly, it is the primary object of this invention to provide a process of producing improved naphthas of low corrosive sulfur content.

Another object of this invention is to provide a catalytic desulfurization process to produce improved naphthas.

A third object of this invention is to provide a method of producing naphthas which pass the distillation-corrosion test.

A further object of the invention is to provide a contact desulfurization process in the presence of such contact materials as bauxite to produce acceptable sweet, odor-free, non-corrosive, sulfur-free special solvent naphthas.

Crude petroleum is the source of a large number of products ranging from simple distillation products including pure hydrocarbons to high molecular weight natural and synthetic resins, elastomers, and polymers produced through physical and chemical transformations. Widely known petroleum derived products include gasoline, kerosene, diesel fuels, lubricating oils, and heavy tars. In many instances, the products obtained from petroleum are employed as reactants in the synthesis of additional petroleum derivatives and chemicals and a large number of products of petroleum are used directly without extended treatment or modification. Petroleum naphthas comprise a wide variety of such latter products used extensively in the dyeing, rubber, extraction, protective coating, and allied industries. A large portion of the petroleum naphthas used is the straight run naphthas which are selected fractions of the lower boiling, more volatile constituents of crude petroleum. The present invention is particularly directed to a method of preparing such straight run naphthas and to naphtha compositions of this variety and, accordingly, the term naphthas as used herein shall mean straight run petroleum naphthas, or their equivalents.

If the preparation of naphthas from petroleum is confined to physical means, the products inevitably contain other types of organic and inorganic compounds due to the complex nature of petroleum which have been found to be deleterious as far as certain end uses of the naphthas are concerned and necessitate the application of additional refining steps. Even with such additional refining, it is exceedingly difficult to prepare naphthas which meet the exacting specifications that have been established by the industry. Of these deleterious non-hydrocarbon compounds the sulfur and sulfur-containing constituents are generally the most bellicose and cling tenaciously to any environment in which they exist, imparting objectionable odor, corrosiveness, color, and other physical and chemical properties thereto. The odor of naphthas is important; however, no standard test exists to cover this property and the odor of a well refined naphtha is generally described as sweet.

Tests have been devised to determine both quantitatively and qualitatively the presence of these odious compounds in an attempt to control the properties and quality of naphthas from petroleum sources. For this purpose, various copper strip corrosion tests and the "doctor" test have been used. Procedures established by A. S. T. M. may be used to determine the content and distribution of these sulfur compounds. Perhaps the most critical and rigorous qualitative test for determining the presence of sulfur compounds in naphthas is the distillation-corrosion test, known also as the Philadelphia test, the Amsco corrosion test, or the full boiling range corrosion test—by any name, a species of copper strip corrosion test. The test, widely applied by the manufacturers, distributors, and users of specialty naphthas, is carried out by the addition of a small pure copper coupon to an ordinary A. S. T. M. distillation flask containing 100 cc. of the naptha to be tested. The copper strip is so positioned in the flask that one end of the strip contacts the residue at the end of the distillation, and the distillation is conducted according to A. S. T. M. D86–38 as described in A. S. T. M. Standards on Petroleum Products and Lubricants, published by the American Society for Testing Materials, Philadelphia, Pennsylvania.

At the completion of the test, wherein the flask has been heated to dryness, the color of the copper strip is an indication of the relative amount of corrosive sulfur compounds present in the naphtha sample. A negative test is shown by the presence of a very slight or moderate tarnish on the strip and stamps the naphtha as satisfactory. If the copper strip becomes moderately blackened, the results are interpreted as positive or unsatisfactory. The production of a slightly tarnished or slightly colored or corroded strip, indicated by a dark orange with peacock colorations thereon, is termed borderline and as such denotes a naphtha which is not acceptable and must be further refined. The market is limited for off-specification naphthas and further refining is expensive since even then there is no assurance that the product will pass the severe distillation-corrosion test.

The subjection of high sulfur content naphthas to various refining and sweetening operations which may include oxidation and extraction methods, or the recycling of rejected off-specification naphthas back through such a process, does not produce acceptable naphthas because the sulfur compounds remaining are corrosive in nature. High sulfur content naphthas usually have a poor odor as well as other undesirable properties. If straight run naphthas from high sulfur crudes are subjected to other more severe refining methods, the resulting products do not pass the distillation-corrosion test. Even subjecting these naphthas to the usual desulfurization treatments involving vapor or liquid phase contact with clay or catalytic materials having strong affinity for effecting desulfurization does not produce a satisfactory product.

According to the present invention, low sulfur, sweet, non-corrosive naphthas are produced from hydrocarbon mixtures by subjecting the mixtures to catalytic desulfurization in the presence of a contact material like bauxite at temperatures between 600° and 800° F. under substantially atmospheric pressure and with space velocities of 0.5 to 2.0. Ordinarily in this process the alkyl sulfur compounds are decomposed during the latter stage of the reaction to give hydrogen sulfide as a product. This hydrogen sulfide is accompanied by small amounts of free sulfur and other corrosive sulfur compounds which are present even through the charging stock has been desulfurized to the extent of 90 to 95 percent. Subsequent caustic washing or other treatment to remove the hydrogen sulfide yields a corrosive product. In accordance with the present invention, the catalytic contact above described is continued until just before hydrogen sulfide becomes a product of the reaction. This point is determined by experience or may be calculated. For example, the maximum yield of non-corrosive product as indicated by the distillation-corrosion test, can be determined by preliminary test runs designed to ascertain the number of barrels of non-corrosive product per ton of bauxite obtainable from a charge stock of a given sulfur content. Plant scale runs can then be conducted to the same yield or just short of this yield. The catalyst may be regenerated and reused in the process.

In order to illustrate the present invention, the following example is given. A 425° F. end point straight run naphtha was treated with bauxite at 750° F. and the distribution of sulfur compounds in the charge and product noted throughout the reaction with the following results:

TABLE I

|  | Charge | Product |
| --- | --- | --- |
| $H_2S$—S Wt. Percent | Trace | Nil |
| Free—S Wt. Percent | Nil | Nil |
| RSH—S Wt. Percent | 0.096 | Nil |
| $R_2S_2$—S Wt. Percent | 0.033 | Nil |
| $R_2S$—S Wt. Percent | 0.083 | Nil |
| Residual, Wt. Percent | 0.012 | 0.003 |
| Total, Wt. Percent | 0.224 | 0.003 |
| Distillation-Corrosion Test | Pos. | Neg. |
| Yield, Bbls./ton |  | 21 |

In order to further illustrate the effect of terminating the reaction before and after the appearance of hydrogen sulfide, a series of experiments were conducted using a 250° to 400° boiling range West Texas naphtha which was desulfurized over bauxite at 650° F. under substantially atmospheric pressure and with a space velocity of about 1.0. The following table shows the sulfur distributions of the charge and the products before and after the appearance of hydrogen sulfide therein:

TABLE II

| Sulfur Distribution | Charge | Before $H_2S$ | After $H_2S$ |
| --- | --- | --- | --- |
| Wt. Percent: |  |  |  |
| Free—S | Nil | Nil | Nil |
| $H_2S$—S | Nil | Nil | [1] Nil |
| RSH—S | 0.013 |  |  |
| $R_2S_2$—S | 0.002 |  |  |
| $R_2S$—S | 0.006 |  |  |
| Residual—S | 0.004 |  |  |
| Total—S | 0.025 | 0.007 | 0.004 |
| Doctor Test | Pos. | Neg. | Neg. |
| Lead Acetate Test | Neg. | Neg. | [1] Neg. |
| Mercury Test | Neg. | Neg. | Pos. |
| Distillation-Corrosion Test | Neg. | Neg. | Pos. |

[1] $H_2S$ removed by caustic wash.

It is seen from the above table that corrosiveness and the degree of desulfurization are not directly related and, further, that a yield of non-corrosive naphtha may be obtained only if the reaction is terminated before hydrogen sulfide appears in the product. After hydrogen sulfide becomes a product of the reaction, the desulfurization continues to take place but the product is corrosive especially to the Amsco test or the distillation-corrosion test.

The yield of non-corrosive product by the present invention will vary somewhat with the sulfur content of the charge and tests show this variation to be from 20 barrels per ton for a relatively high sulfur charge to 300 barrels per ton for a relatively low sulfur charge. In each instance, in carrying out the reaction in accordance with this invention desulfurization was satisfactory for thousands of barrels of product per ton of charge.

Reference to Table II above shows that the charge naphtha is sour but non-corrosive. The product before the appearance of hydrogen sulfide is sweet and non-corrosive, but the appearance of hydrogen sulfide causes the product to fail the distillation-corrosion test although it is doctor sweet.

Although the invention has been described by the use of relatively low sulfur stocks, it is not necessarily limited thereto because high sulfur stocks may be employed provided they are first subjected to a desulfurization treatment prior to subjection to the present sweetening or contact desulfurization processes. Accordingly, the present invention may be used to treat high sulfur crude oils containing from 1.0 to 3.0 weight percent sulfur wherein the crude oil is fractionated to remove more volatile components and high boiling residues to use a wide boiling range virgin or naphtha gas oil which may boil from 100° to 500° F. Such high sulfur products must be subjected to preliminary desulfurization by any known method in order to reduce the total sulfur content to about 0.40 weight percent or lower. The invention is particularly applicable to naphtha fractions which contain a low total sulfur content but which fail to qualify as sweet products. By this is meant that the naphtha to be treated shows the presence of corrosive sulfur compounds as indicated by one or more of the various tests which are applied to give an indication of the presence of such sulfur compounds, as, for example, the doctor, lead acetate, mercury, or distillation-corrosion tests.

The term "bauxite" as used herein is meant to include the natural forms of aluminum oxides ($Al_2O_3 \cdot H_2O$; $Al_2O_3 \cdot 2H_2O$; and $Al_2O_3 \cdot 3H_2O$) of differing states of hydration with both ferruginous and non-ferruginous impurities including varying amounts of water, ferric oxide, titanic oxide and silica. The aluminum-iron hydrate mixtures included within the meaning of the term "bauxite" may contain from 50 to 70 percent $Al_2O_3$, about 25 to 30 percent water with varying amounts of ferric and/or ferrous oxides, class IV metal oxides and mixtures thereof.

What is claimed is:

1. The process for producing non-corrosive special solvent naphthas from petroleum hydrocarbon mixtures containing corrosive sulfur compounds which comprises subjecting said hydrocarbons to contact with bauxite at a temperature of 600° and 800° F., terminating said contact before hydrogen sulfide appears in the effluent therefrom, and fractionating the products to produce special solvent naphthas characterized by their ability to pass the distillation-corrosion test.

2. The process in accordance with claim 1 in which the reaction is carried out at a temperature at about 650° F. at substantially atmospheric pressure, and with a space velocity of about 1.0.

3. The method in accordance with claim 1 in which the hydrocarbon mixture to be treated contains about 0.2 weight percent of corrosive sulfur compounds.

4. The method in accordance with claim 1 in which the naphtha products contain 0.007 weight percent of sulfur or less.

References Cited in the file of this patent
UNITED STATES PATENTS

| | | |
|---|---|---|
| 2,391,091 | Hewlett et al. | Dec. 18, 1945 |
| 2,515,131 | Mack | June 11, 1950 |
| 2,560,330 | Brandon | July 10, 1951 |